United States Patent
Suzuki (10) Patent No.: US 9,090,249 B2
(45) Date of Patent: Jul. 28, 2015

(54) SHIFT CONTROL DEVICE FOR CONTINUOUSLY-VARIABLE TRANSMISSION AND SHIFT CONTROL METHOD FOR CONTINUOUSLY-VARIABLE TRANSMISSION

(75) Inventor: Tomoyuki Suzuki, Isehara (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 22 days.

(21) Appl. No.: 14/233,481

(22) PCT Filed: Jun. 11, 2012

(86) PCT No.: PCT/JP2012/064919
§ 371 (c)(1),
(2), (4) Date: Jan. 17, 2014

(87) PCT Pub. No.: WO2013/015029
PCT Pub. Date: Jan. 31, 2013

(65) Prior Publication Data
US 2014/0155223 A1    Jun. 5, 2014

(30) Foreign Application Priority Data

Jul. 28, 2011  (JP) .................................. 2011-165618

(51) Int. Cl.
*B60W 10/04*    (2006.01)
*B60W 10/101*   (2012.01)
*B60W 10/11*    (2012.01)
(Continued)

(52) U.S. Cl.
CPC .............. *B60W 10/11* (2013.01); *B60W 10/04* (2013.01); *F16H 59/18* (2013.01); *F16H 59/48* (2013.01); *F16H 61/66259* (2013.01);
(Continued)

(58) Field of Classification Search
CPC ...... B60W 10/04; B60W 10/101; F16H 59/18; F16H 2059/183; F16H 61/66
USPC .................................................. 701/51, 53, 65
See application file for complete search history.

(56) References Cited

U.S. PATENT DOCUMENTS 4,976,170 A    12/1990  Hayashi et al.
5,005,442 A     4/1991  Sakakibara et al.
(Continued)

FOREIGN PATENT DOCUMENTS

JP    64-044394 A    2/1989
JP    01-176846 A    7/1989
(Continued)

*Primary Examiner* — Edwin A Young
(74) *Attorney, Agent, or Firm* — Foley & Lardner LLP (57) ABSTRACT

A shift control device for a continuously-variable transmission has operation condition detecting means, which detect the operation conditions of a vehicle, a control means, which controls the transmission ratio of the continuously-variable transmission based on the operation conditions, an acceleration demand identifying means, which identifies whether acceleration is demanded by the driver, a linear mode setting means, which, based on the demand for acceleration, sets a linear mode, which provides the transmission ratio such that the input revolution speed of the continuously-variable transmission becomes high compared to a normal mode at the same vehicle speed, a front/rear G detecting means, which detects the front/rear G of the vehicle, and a linear mode cancelling means, which, when it is identified that acceleration is not demanded based on the front/rear G during drive in the linear mode, cancels the linear mode even under conditions to carry out the linear mode.

7 Claims, 6 Drawing Sheets (51) Int. Cl.
  *F16H 61/662* (2006.01)
  *F16H 59/18* (2006.01)
  *F16H 59/48* (2006.01)
(52) U.S. Cl.
  CPC ... *B60W 2520/105* (2013.01); *B60W 2540/106* (2013.01); *Y10T 477/65* (2015.01)

(56) References Cited

U.S. PATENT DOCUMENTS 6,098,001 A    8/2000    Yuasa
2008/0255737 A1*  10/2008  Fujiwara et al. ............... 701/51
2010/0191428 A1*   7/2010  Tamura et al. ................. 701/58
2011/0015835 A1*   1/2011  Takahashi et al. ............. 701/55

FOREIGN PATENT DOCUMENTS

| JP | 07-119804 A  | 5/1995  |
| JP | 10-047461 A  | 2/1998  |
| JP | 2002-156036 A | 5/2002  |
| JP | 2002-372143 A | 12/2002 |
| JP | 2007-326465 A | 12/2007 |
| JP | 2009-085291 A | 4/2009  |
| JP | 2011-036072   | 2/2011  |

* cited by examiner

SHIFT CONTROL DEVICE FOR CONTINUOUSLY-VARIABLE TRANSMISSION AND SHIFT CONTROL METHOD FOR CONTINUOUSLY-VARIABLE TRANSMISSION

TECHNICAL FIELD

The present invention relates to a transmission control device for a continuously-variable transmission.

BACKGROUND ART

As a transmission ratio control for a continuously-variable transmission, a control mode (hereinafter referred to as "normal mode"), which basically controls the transmission ratio on a variable basis in accordance with the operation condition, and which, when the driver's demand for acceleration is strong, makes a transition to a control mode (hereinafter referred to as "linear mode") to provide the transmission ratio such that the input revolution speed of the continuously-variable transmission becomes high compared to the normal mode at the same vehicle speed. That is, the linear mode is a mode to moderate the change of the transmission ratio compared to the normal mode.

For example, in JP2002-372143A, when the accelerator opening exceeds a threshold, it is determined that the demand for acceleration is strong, and a transition to the linear mode to moderate the change of the transmission ratio is made. By this means, when the engine revolution speed increases due to the increase of the throttle opening, the driving force also increases quickly. In other words, the delay in time after the throttle opening increases until a feeling of acceleration is gained becomes short, so that it is possible to alleviate the disagreeable feeling to be given to the driver.

Then, when the accelerator opening decreases by a predetermined amount during linear mode drive, it is determined that the demand for acceleration has lowered, and the linear mode is cancelled and a transition to the normal mode is made.

SUMMARY OF INVENTION

However, given that, with the control according to JP2002-372143A, the degree of demand for acceleration is determined based on the accelerator opening, cases might occur where it is not possible to sense a decline in the driver's demand for acceleration during linear mode drive. For example, when the amount of change of the accelerator opening is little and its speed of change is also slow, such as when trying to make a seamless transition to not real drive after the start and acceleration, it is not possible to sense a decline in the demand for acceleration. In this case, despite the fact that normal drive is in progress, the linear mode is not canceled, and therefore the internal combustion engine maintains high-speed revolution and gives the driver a disagreeable feeling. Also, the engine revolution speed that is maintained high may result in poorer mileage performance.

It is therefore an object of the present invention to provide a shift control device for a continuously-variable transmission, whereby, when acceleration is finished and a transition to normal drive is made, it is possible to reliably sense that the driver no longer intends to accelerate, and make a transition to the normal mode.

To achieve the above object, the present invention has operation condition detecting means, which detect the operation conditions of a vehicle, including the vehicle speed and the accelerator opening, a control means, which controls the transmission ratio of the continuously-variable transmission based on the operation conditions, an acceleration demand identifying means, which identifies whether acceleration is demanded by the driver, and a linear mode setting means, which, based on the demand for acceleration by the driver, sets a linear mode, which provides the transmission ratio such that the input revolution speed of the continuously-variable transmission becomes high compared to a normal mode at the same vehicle speed. Furthermore, it is a characteristic of the present invention to have a front/rear G detecting means, which detects the front/rear G of the vehicle, and a linear mode cancelling means, which, when it is identified that acceleration is not demanded based on the front/rear G during drive in the linear mode, cancels the linear mode even under conditions to carry out the linear mode.

The details of this invention, as well as other characteristics and advantages, will be explained in the following description herein, and are also shown in the accompanying drawings.

DESCRIPTION OF EMBODIMENTS

Figure 1:
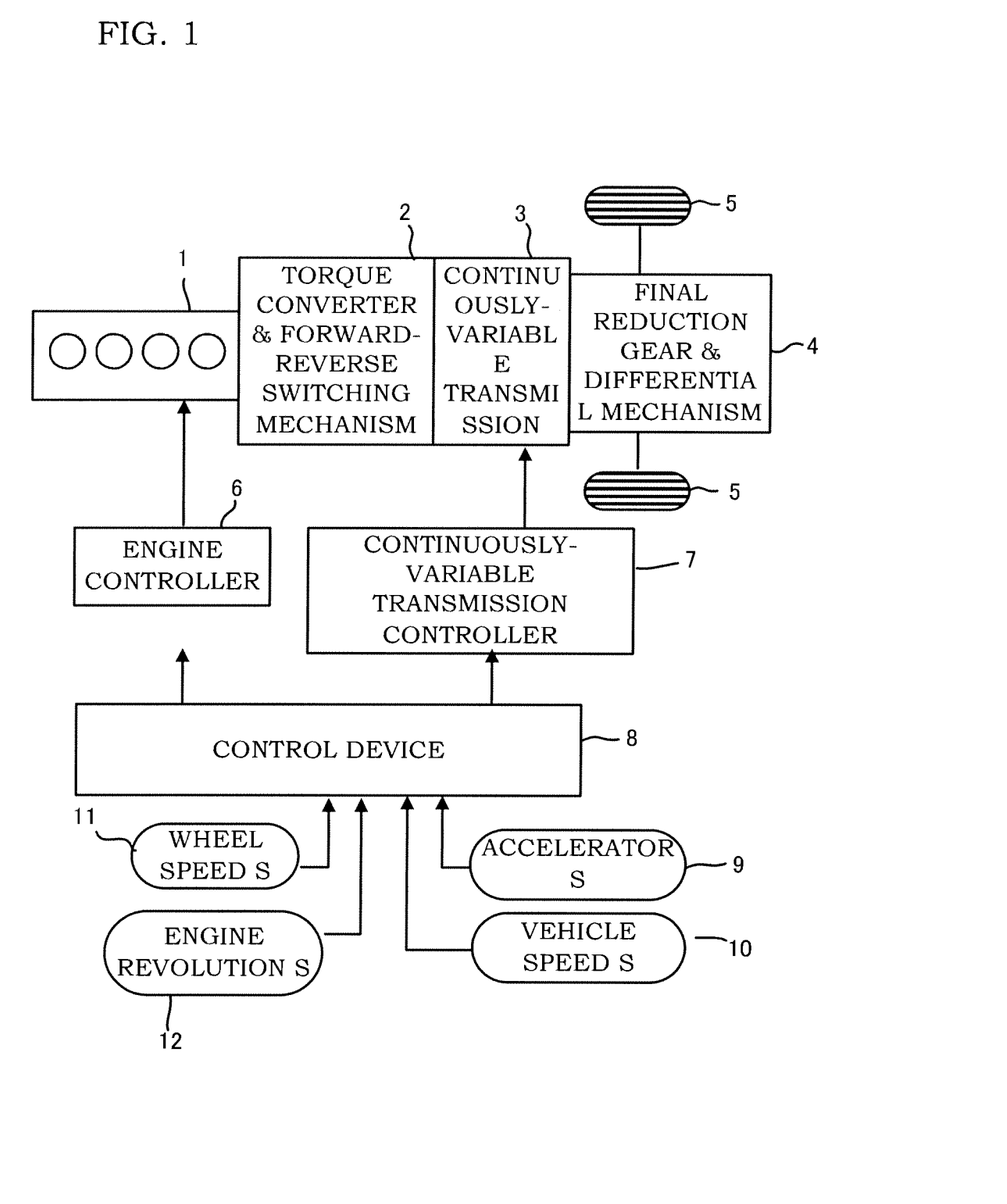
FIG. 1 is a schematic configuration diagram showing an embodiment of a vehicle on which a shift control device according to the present invention is mounted.

FIG. 1 shows a schematic configuration of a vehicle, on which a shift control device according to the present invention is mounted. The driving force of an internal combustion engine 1 is transmitted to drive wheels 5 via a torque converter and a forward-reverse switching mechanism 2, a continuously-variable transmission 3, and a final reduction gear and a differential mechanism 4.

In the internal combustion engine 1, a fuel injection amount control, an ignition time control and so on, are executed by the engine controller 6.

In the continuously-variable transmission 3, the transmission ratio is controlled by the continuously-variable transmission controller 7 in a continuous fashion.

The control device 8 is formed with the above controllers 6 and 7, and also with a microcomputer and its peripherals, and controls the vehicle generally. To this control device 8, an accelerator sensor 9, which detects the accelerator opening (the amount of accelerator pedal operation), a vehicle speed sensor 10, which detects the driving speed of the vehicle, a wheel speed sensor 11 for detecting the wheel speed of the drive wheels 5, an engine revolution speed sensor 12, which detects the revolution speed of the internal combustion engine 1, and so on are connected. The continuously-variable transmission controller 7 corresponds to the control means of the present invention, and the accelerator sensor 9 and the vehicle speed sensor 10 both correspond to the operation condition detecting means of the present invention.

Note that, in the following description, a belt-type CVT by a variable pulley mechanism will be assumed as the continuously-variable transmission 3, and the transmission ratio may be referred to by the word "pulley ratio." The pulley ratio or the transmission ratio is synonymous to the reduction ratio—that is, its value represents the input pulley revolution speed/output pulley revolution speed.

Figure 2:
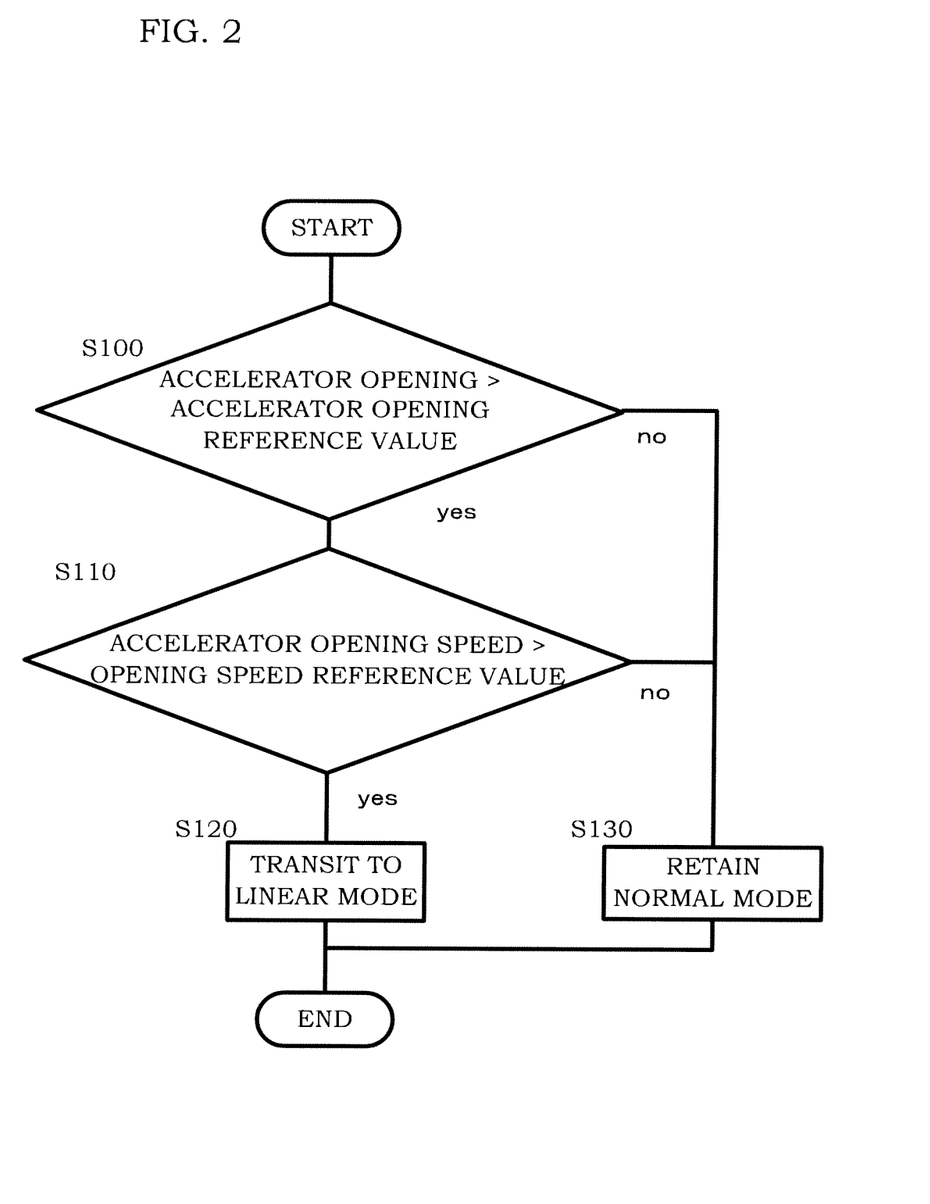
FIG. 2 is a flowchart showing a control routine for a transition from a normal mode to a linear mode, carried out by a continuously-variable transmission controller.
Figure 3:
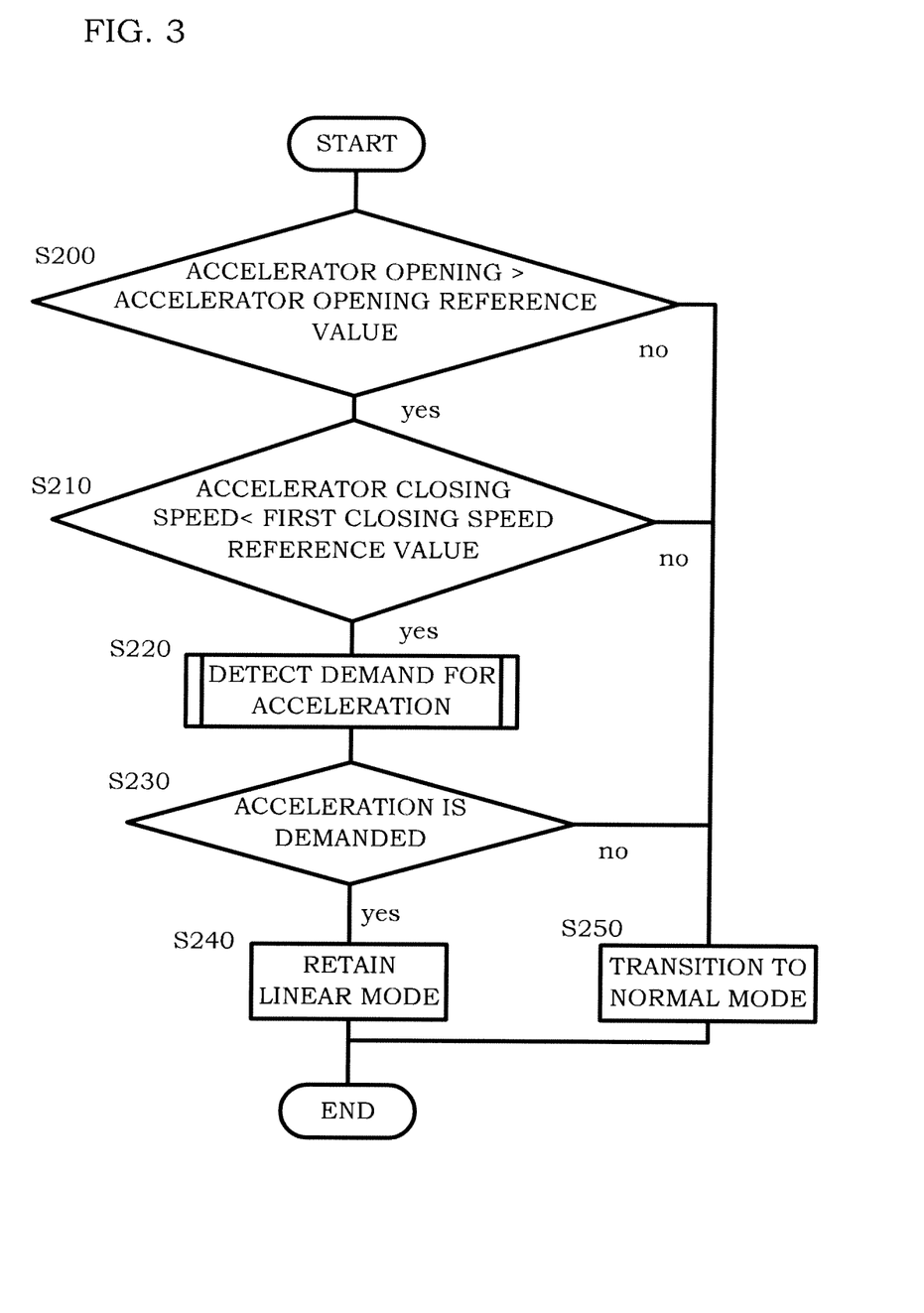
FIG. 3 is a flowchart showing a control routine for a transition from a linear mode to a normal mode, carried out by a continuously-variable transmission controller.

FIG. 2 shows, among the shift controls executed by the continuously-variable transmission controller 7, the control routine to determine whether or not to make a transition from the normal mode to the linear mode. FIG. 3 shows, among the shift controls executed by the continuously-variable transmission controller 7, the control routine to determine whether or not to make a transition from a linear mode to a normal mode. Either control routine is carried out and repeated in a short cycle of, for example, approximately 10 milliseconds.

The control routine of FIG. 2 shows an example of a control routine to decide whether or not it is necessary to make a transition from the normal mode to the linear mode. Note that the content of this control routine is in the public domain.

In step S100, the continuously-variable transmission controller 7 decides whether or not the accelerator opening that is detected in the accelerator sensor 9 is greater than an accelerator opening reference value, which is set in advance as a threshold for identifying acceleration. When the accelerator opening is greater than the accelerator opening reference value, the process of step S110 is carried out, and, when the accelerator opening is smaller than the accelerator opening reference value, the normal mode is determined to be retained in step S130, and the process this time is finished.

In step S110, the continuously-variable transmission controller 7 decides whether or not the accelerator opening speed that is calculated based on the detection value of the accelerator sensor 9 is greater than an opening speed reference value that is set in advance as a threshold for identifying acceleration. When the accelerator opening speed is greater than the opening speed reference value, the process of step S120 is carried out, and, when the accelerator opening speed is lower than the opening speed reference value, the normal mode is determined to be retained in step S130, and the process this time is finished.

In step S120, the continuously-variable transmission controller 7 determines a transition to the linear mode.

In either the normal mode or the linear mode, the transmission ratio is set in accordance with a transmission characteristic map for each mode, in which the relationship between the input revolution speed of the continuously-variable transmission 3 and the vehicle speed is set on a per accelerator opening basis. However, in the event of the linear mode, the change of the transmission ratio demonstrates moderate transmission characteristics compared to the normal mode. In other words, compared at the same accelerator opening and the same vehicle speed, the input speed of the continuously-variable transmission 3 is higher in the linear mode than in the normal mode.

When a transition to the linear mode is made according to the control routine of FIG. 2, the transmission ratio is controlled in accordance with the transmission characteristic map for the linear mode, and also whether or not to cancel the linear mode according to the control routine of FIG. 3 is decided.

In step S200, the continuously-variable transmission controller 7 decides whether or not the accelerator opening is greater than the accelerator opening reference value as the threshold. When the accelerator opening is greater than the accelerator opening reference, the process of step S210 is carried out, and, when the accelerator opening is smaller than the accelerator opening reference, a transition to the normal mode is determined in step S250, and this control routine is finished. The accelerator opening reference value is set to a comparatively small opening, similar to the threshold upon determining to cancel the linear mode in a shift control device in the public domain, and is set to, for example, approximately ⅛.

In step S210, the continuously-variable transmission controller 7 decides whether or not the accelerator closing speed that is calculated based on the detection value of the accelerator sensor 9 is lower than the first closing speed reference value that is set in advance. The first closing speed reference value is set to a comparatively fast speed, similar to the threshold upon determining to cancel the linear mode in a shift control device in the public domain, and is set to, for example, approximately 100 deg/sec. When the accelerator closing speed is lower than the first closing speed reference value, the process of step S220 is carried out, and, when the accelerator closing speed is greater than the first closing speed reference value, a transition to the normal mode is determined in step S250, and this control routine is finished.

As a routine to determine cancellation of the linear mode, step S200 and step S210 described above are in the public domain.

In step S220, the continuously-variable transmission controller 7 carries out the identification of demand for acceleration described below.

Figure 4:
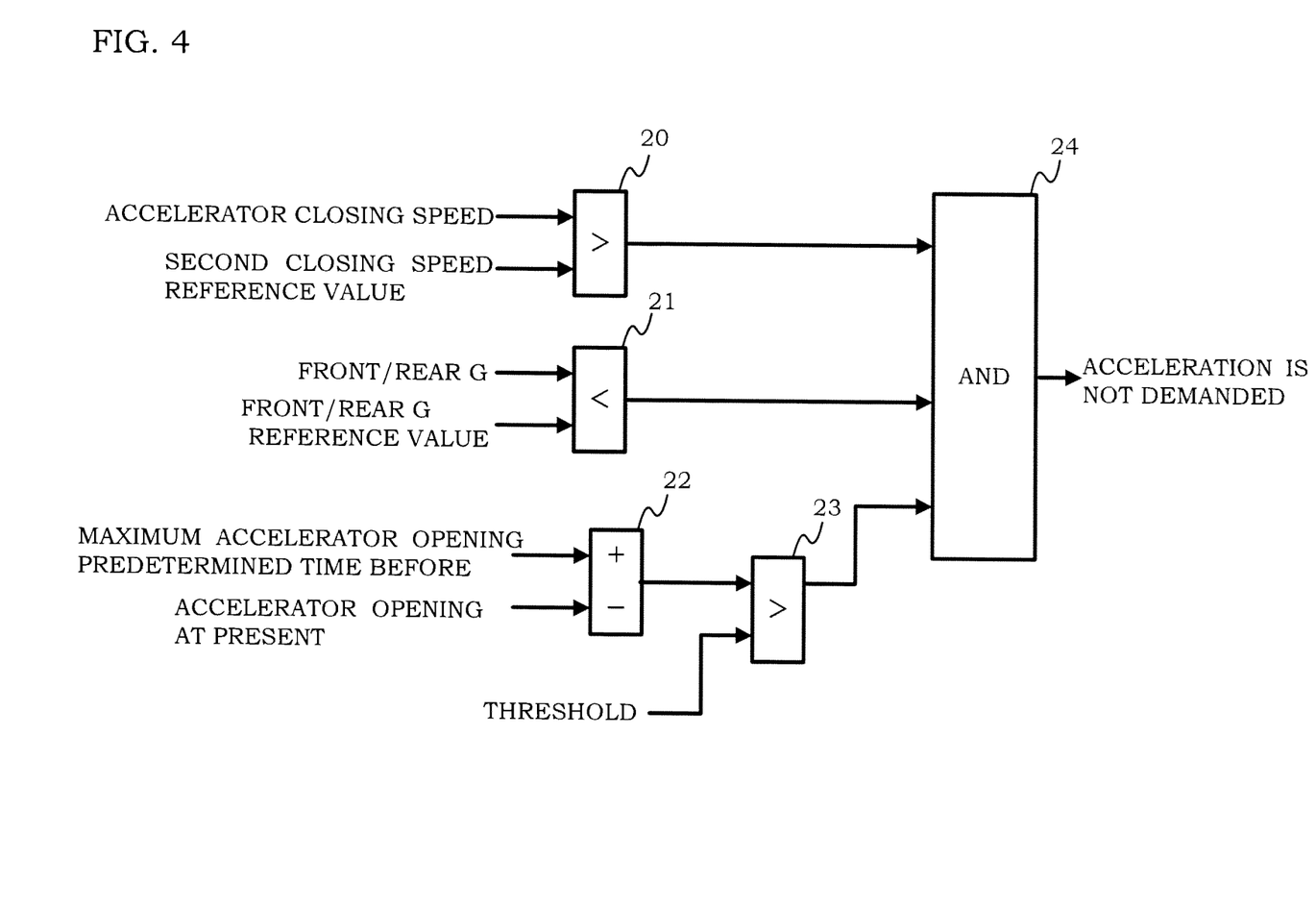
FIG. 4 is a control block diagram of identification of demand for acceleration, which is carried out by a continuously-variable transmission controller during a linear mode.

FIG. 4 is a block diagram showing the content of the operations of identification of demand for acceleration, carried out while the continuously-variable transmission controller 7 is in the linear mode. This block diagram shows the content of the operations schematically, and does not represent a physical configuration.

In a decision unit 20, whether or not the accelerator closing speed is greater than a second closing speed reference value is decided, and, when it is, the result is input in a decision unit 24. The second closing speed reference value is for sensing only whether or not the driver has released the accelerator pedal intentionally, so that its value is set as small as possible within the range decision errors can be avoided. For example, the value is set to approximately 20 deg/sec.

In the decision unit 21, whether or not the front/rear G is smaller than the G reference value is decided, and, when it is, the result is input in the decision unit 24. The G reference value is set as follows. For example, even when the accelerator opening is constant, although the degree of acceleration decreases following the increase of speed, this decrease of the degree of acceleration becomes more obvious from a low vehicle speed when the output of the internal combustion engine 1 is lower or when the weight of the vehicle is heavier. The same applies when the driving environment changes from a flat road to an uphill road. Meanwhile, when the output of the internal combustion engine 1 becomes higher, or when the weight of the vehicle is lighter, the influence of the increase of the vehicle speed and the road surface gradient upon the degree of acceleration becomes less. So, the G reference value is set as appropriate in accordance with the specifications of the internal combustion engine 1 and the vehicle, and so on.

The front/rear G is calculated from the wheel speed and the output shaft revolution speed of the continuously-variable transmission 3. The output shaft revolution speed of the continuously-variable transmission 3 is detected in an output shaft revolution speed sensor, which is not illustrated.

Although it is possible to detect the front/rear G directly using a G sensor, the detection values of the G sensor may show the influence of the road surface gradient. Consequently, when, for example, a flat road changes to an uphill road and so on, cases might occur where the front/rear G becomes smaller than the G reference value even if the driver intends to accelerate. So, in order to remove the influence of the change of the driving environment, the front/rear G is calculated based on the wheel speed of the drive wheels 5 or the output shaft revolution speed of the continuously-variable transmission 3.

In the subtraction unit 22, the present accelerator opening is subtracted from the maximum accelerator opening from a predetermined time earlier up to the present, and the result is input in a decision unit 23. Although it is equally possible to use the maximum accelerator opening after a transition to the linear mode up to the present, a value from a predetermined earlier is used in order to make decisions based on a more recent state. The predetermined time is, for example, approximately 5 seconds. By comparing the current accelerator opening with the maximum value in a predetermined time, instead of the latest value, it is possible to more accurately sense whether or not acceleration is intended.

In the decision unit 23, whether or not the result of the operation of the subtraction unit 22 is greater than a threshold that is set in advance is decided, and, when it is, the result is input in the decision unit 24. For the threshold, a value that may exclude accelerator operations which the driver makes unintentionally or cases where acceleration is intended and where nevertheless the accelerator pedal is released slightly for speed adjustment, and so on, is set.

When all the decision results of the decision units 20 to 23 are input, the decision unit 24 decides that there is no demand for acceleration. A return is then made to the flowchart of FIG. 3.

In step S230, the continuously-variable transmission controller 7 decides whether or not there is a demand for acceleration based on the decision result of step S220. When there is a demand for acceleration, the linear mode is determined to be retained in step S240, and the process this time is finished. On the other hand, when there is no demand for acceleration, a transition to the normal mode is determined in step S250, and this control routine is finished.

Figure 5:
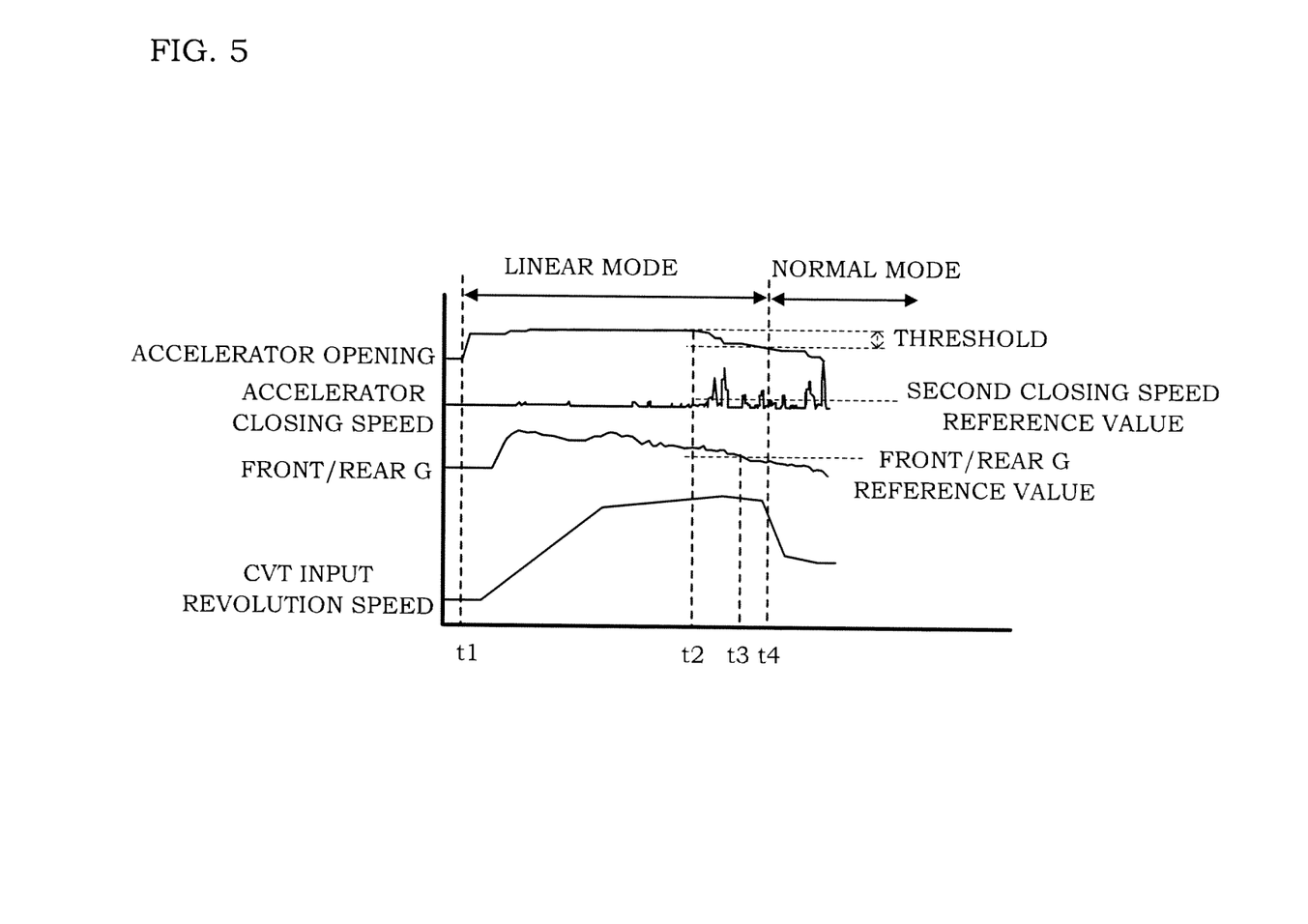
FIG. 5 is a time chart when the control routine of FIG. 3 is carried out.

FIG. 5 is the time chart when this control routine is carried out.

After a transition to the linear mode is made at time t1, the accelerator opening starts decreasing at time t2. After time t2 and before time t3, although there are several times where the accelerator closing speed becomes greater than the second closing speed reference value, at each time, the linear mode is retained because the accelerator opening does not satisfy the condition. Although the front/rear G becomes lower than the front/rear G reference value at time t3, again, the accelerator opening does not satisfy the condition, and therefore the linear mode is retained. At time t4, the three conditions of the accelerator opening, the accelerator closing speed, and the front/rear G are all present, and a transition to the normal mode is made. Then, by the transition to the normal mode, the input speed of the continuously-variable transmission 3 is decreased.

As described above, the front/rear G of the vehicle is used as a decision value for cancelling the linear mode and determining a transition to the normal mode, so that it is possible to make decisions in accordance with the change of the degree of acceleration of the vehicle. Then, by using the accelerator closing speed as the above decision value as well, it is possible to avoid making decision errors when acceleration is intended and nevertheless the front/rear G decreases, such as when entering an uphill road. Furthermore, by using the amount of release from the maximum accelerator opening during the linear mode as the above decision value as well, it is possible to prevent the linear mode from being cancelled when the amount of release is so insubstantial in scale and does not exceed a threshold, such as when the driver makes accelerator operations unintentionally.

Figure 6:
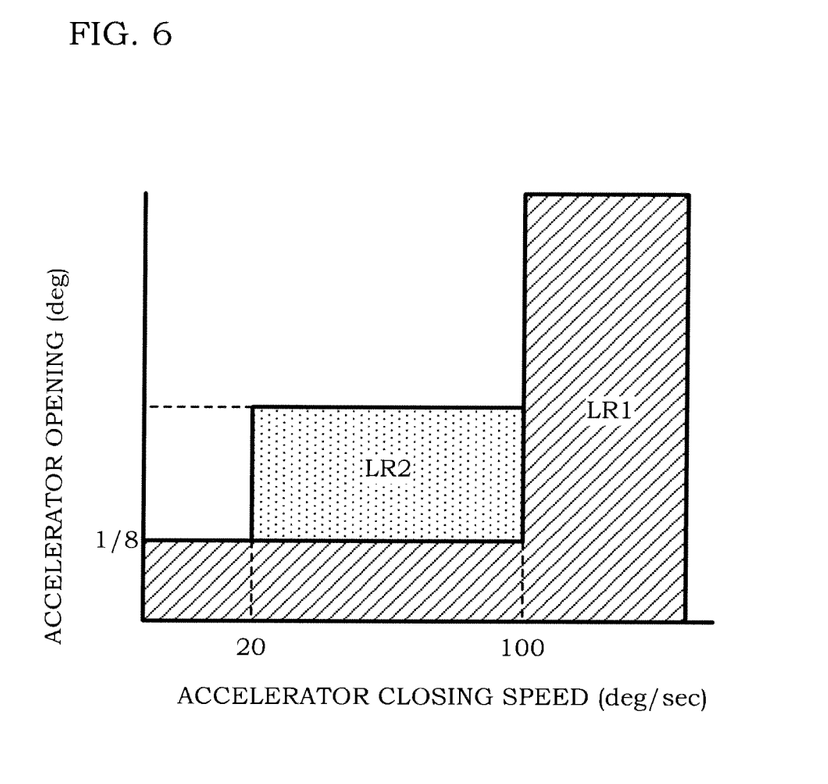
FIG. 6 is a diagram showing regions where a linear mode is cancelled, according to the present embodiment.

FIG. 6 is a diagram showing regions where the linear mode is cancelled according to the control routine of FIG. 3. The vertical axis is the accelerator opening, and the horizontal axis is the accelerator closing speed. The region LR1 and region LR2 are the regions where the linear mode is cancelled when the accelerator opening reference value is made ⅛, the first closing speed reference value is made 100 deg/sec, and the second closing speed reference value is made 20 deg/sec. Note that each reference value is simply an example.

The region LR1 is the region where the linear mode is cancelled in the processes of step S200 and step S210—that is, the region where the linear mode is cancelled in prior art as well. To be more specific, this is the region to apply when the accelerator opening becomes a very low opening, or when the accelerator opening suddenly becomes smaller such as when the foot leaves the accelerator pedal.

The region LR2 is the region where it becomes possible to cancel the linear mode by the processes of steps S220 and S230 of this control routine. To be more specific, this is the region to apply when the driver tries to make a transition from accelerated drive to normal drive and releases the accelerator pedal back to a low/middle opening in a comparatively moderate fashion. Note that the upper limit value of the accelerator opening for the region LR2 is an accelerator opening that is slightly greater than the accelerator opening for normal drive, determined from the load-load curve, and, to be more specific, is determined from the relationship with the front/rear G reference value.

In these regions, when the linear mode is retained, the state in which the engine revolution speed is high is maintained, which not only gives a disagreeable feeling to the driver but may also result in poorer practical mileage. However, according to this control routine, the linear mode can be cancelled in the region LR2 as well, so that it is possible to solve these problems.

The advantage of the above-described present embodiment may be summarized as follows.

Whether or not the driver intends to accelerate is decided based on the front/rear G during linear mode drive, so that it is possible to reliably sense a transition to normal drive and cancel the linear mode. As a result of this, it becomes possible to cancel the linear mode even in a region where it has been not possible to cancel the linear mode according to decisions based on the accelerator opening and the accelerator closing speed alone, such as the region LR2 of FIG. 6.

Also, whether or not acceleration is intended during linear mode drive is decided based on the accelerator closing speed as well in addition to the front/rear G, so that it is possible to avoid making decision errors in the situation where acceleration is intended and where nevertheless the front/rear G decreases, such as when entering an uphill road from a flat road.

Furthermore, whether or not acceleration is intended during linear mode drive is decided based on the amount of release from the maximum opening during the linear mode as well, so that it is possible to prevent the linear mode from being cancelled when the amount of release of the accelerator pedal is small.

The front/rear G is calculated based on the wheel speed and the output shaft revolution speed of the continuously-variable transmission, so that it is possible to accurately sense when acceleration is no longer intended even during drive on an uphill road.

The maximum accelerator opening during the linear mode is made the maximum opening from the present back to a predetermined time earlier, so that it is possible to decide whether or not acceleration is intended, based on the latest condition.

Although an embodiment of e present invention has been described above, the above embodiment illustrates only part of an example of application of the present invention, and is not meant to limit the technical scope of the present invention to the specific configurations of the above-described embodiment.

This application claims priority based on Japanese Patent Application No. 2011-165618, filed with the Japan Patent Office, on Jul. 28, 2011, the entire content of which is expressly incorporated into this specification.

The invention claimed is:

1. A shift control device for a continuously-variable transmission, the shift control device comprising:
   an operation condition detecting device adapted to detect operation conditions of a vehicle, including a vehicle speed and an accelerator opening;
   a control device adapted to control a transmission ratio of the continuously-variable transmission based on the operation conditions;
   an acceleration demand identifying device adapted to identify whether acceleration is demanded by a driver; and
   a linear mode setting device adapted to set a linear mode which provides the transmission ratio such that an input revolution speed of the continuously-variable transmission becomes high compared to a normal mode at a same vehicle speed, when the acceleration demand identifying device identities that acceleration is demanded by the driver based on the acceleration opening and an accelerator opening speed, wherein the shill control device further comprises:
   a front/rear G detecting device adapted to detect a front/rear G of the vehicle; and
   a linear mode cancelling device adapted to cancel the linear mode when the acceleration demand identifying device identifies that acceleration is not demanded based on the front/rear G during drive in the linear mode, even when the acceleration opening and the accelerator opening speed satisfy.

2. The shift control device for a continuously-variable transmission according to claim 1, further comprising accelerator pedal closing speed detecting device adapted to detect a closing speed of an accelerator pedal,
   wherein the acceleration demand identifying device identifies whether or not acceleration is demanded during drive in the linear mode, based on the front/rear G, and, in addition, based on the closing speed of the accelerator pedal.

3. The shill control device for a continuously-variable transmission according claim 2, further comprising an accelerator opening detecting device adapted to detect an opening of the accelerator pedal,
   wherein the acceleration demand identifying device identifies whether or not acceleration is demanded, during drive in the linear mode, based on the front/rear G and the closing speed of the accelerator pedal, and, in addition, based on an amount of release of an accelerator from a maximum accelerator opening in the linear mode.

4. The shift control device for a continuously-variable transmission according to claim 1, wherein the front/rear G detecting device adapted to calculate the front/rear G based on a wheel speed or an output shaft revolution speed of the continuously-variable transmission.

5. The shift control device for a continuously-variable transmission according to claim 3, wherein the maximum opening in the linear mode is made a maximum opening from present back to a predetermined time earlier.

6. A shift control device for a continuously-variable transmission, the shift control device comprising:
   operation condition detecting means for detecting operation conditions of a vehicle, including a vehicle speed and an accelerator opening;
   control means for controlling a transmission ratio of the continuously-variable transmission based on the operation conditions;
   acceleration demand identifying means for identifying whether acceleration is demanded by a driver; and
   linear mode setting means for setting a linear mode which provides the transmission ratio such that an input revolution speed of the continuously-variable transmission becomes high compared to a normal mode at a same vehicle speed, when the acceleration demand identifying means identities that acceleration is demanded by the driver based on the acceleration opening and an accelerator opening speed, wherein the shift control device further comprises:
   front/rear G detecting means for detecting a front/rear G of the vehicle; and
   linear mode cancelling means for canceling the linear mode when the acceleration demand identifying means identifies that acceleration is not demanded based on the front/rear G during drive in the linear mode, even when the acceleration opening and the accelerator opening speed satisfy.

7. A shift control method for a continuously-variable transmission, comprising:
   detecting operation conditions of a vehicle, including a vehicle speed and an accelerator opening;
   controlling a transmission ratio of the continuously-variable transmission based on the operation conditions;
   identifying whether acceleration is demanded by a driver; and
   setting a linear mode which provides the transmission ratio such that an input revolution speed of the continuously-variable transmission becomes high compared to a normal mode at a same vehicle speed, when the acceleration demand identifying means identifies that acceleration is demanded by the driver based on the acceleration opening and an accelerator opening speed, wherein the shift control method further comprises:
   detecting a front/rear G of the vehicle; and
   canceling the linear mode when acceleration is not demanded based on the front/rear G during drive in the linear mode, even when the acceleration opening and the accelerator opening speed satisfy.

* * * * *